(12) United States Patent
Sungkhaphong et al.

(10) Patent No.: US 8,565,511 B1
(45) Date of Patent: Oct. 22, 2013

(54) APPARATUS AND METHOD TO ALIGN A MANUFACTURING DEVICE HAVING AN END EFFECTER AND FIXTURE IN A PARALLEL MANNER

(75) Inventors: Komgrit Sungkhaphong, Bangkok (TH); Nirun Nuntapet, Pathumthani (TH)

(73) Assignee: Western Digital Technologies, Inc., Irvine, CA (US)

( * ) Notice: Subject to any disclaimer, the term of this patent is extended or adjusted under 35 U.S.C. 154(b) by 491 days.

(21) Appl. No.: 12/976,079

(22) Filed: Dec. 22, 2010

(51) Int. Cl.
*G06K 9/00* (2006.01)
*G06K 9/36* (2006.01)

(52) U.S. Cl.
USPC .......................................... 382/151; 382/287

(58) Field of Classification Search
USPC .................. 382/151, 286, 287, 289, 294, 309
See application file for complete search history.

(56) References Cited

U.S. PATENT DOCUMENTS

| 5,322,993 A | 6/1994 | Ohyama |
| 6,591,161 B2 * | 7/2003 | Yoo et al. ...................... 700/218 |
| 7,088,659 B2 | 8/2006 | Hibino |
| 2009/0240372 A1 * | 9/2009 | Bordyn et al. ................ 700/259 |

* cited by examiner

*Primary Examiner* — Daniel Mariam

(57) ABSTRACT

Disclosed is an alignment system comprising: an upper reflector to couple to an end effecter and a camera kit to couple to a fixture. The camera kit includes: a plurality of light sources; a camera; and a lower reflector including a camera opening and a plurality of light source openings. The lower reflector may be approximately parallel to the fixture. The camera may be positioned beneath the camera opening and may capture light images reflected from both the lower reflector and the upper reflector from the plurality of light sources. An image processor is coupled to the camera, wherein image data associated with the captured light images is transmitted from the camera to the image processor. The image processor is used to determine an adjustment value based upon the image data to tilt the end effecter such that the end effecter is moved to be approximately parallel to the fixture.

22 Claims, 5 Drawing Sheets

APPARATUS AND METHOD TO ALIGN A MANUFACTURING DEVICE HAVING AN END EFFECTER AND FIXTURE IN A PARALLEL MANNER

BACKGROUND

Computing devices are routinely used at work, at home, and everywhere else. Computing devices advantageously enable electronic communication, data sharing (e.g., documents, pictures, music, film, etc.), the use of application-specific software, and access to information for electronic commerce through the Internet and other computer networks.

The term computing device generally refers to desktop computers, laptop computers, mobile computing devices (e.g., personal digital assistants (PDAs), cell-phones, etc.), as well as any other type of computer system. A computing device typically includes many components such as processors, memory, disk drives, as well as many other types of electronic devices, electromechanical devices, and mechanical devices.

The components used in computing devices, as well as other types of high technology electrical, electromechanical, and mechanical devices typically need to be assembled in a very precise and cost effective manner. Cost effectiveness includes that complex components need to be assembled in a very time effective manner with a very low error rate—even though many of the components require highly precise assembly. Also, many of these types of devices need to be assembled in a very clean fashion in which debris and contamination particles are kept to a minimum.

Many manufacturing devices include an end effecter and a work piece that is mounted to a fixture. The work piece being a device that is being assembled with various components. The end effecter typically takes a component and attaches the component in a pre-designated manner to the device being assembled. Unfortunately, with the increased precision assembly requirements to create today's high technology devices, many effecters are not aligned accurately enough with the device being manufactured during the assembly process which results in device assembly failures and increased costs. For example, oftentimes the end effecter is not aligned in a sufficiently parallel manner with the device to precisely assemble components to the device.

Accordingly, techniques to more accurately align an end effecter to a device being manufactured are sought after.

DETAILED DESCRIPTION

Embodiments of the invention relate to an alignment system to align a manufacturing device having an end effecter and a fixture in a parallel manner. In one embodiment, a pair of reflectors may be utilized in combination with a camera kit to capture a light image which may be utilized by an image processor in order to tell a manufacturing operator how to adjust the end effecter of the manufacturing device to be parallel to the fixture for manufacturing purposes. In this way, devices attached to the fixture may be assembled with components by the end effecter in an improved manner because the end effecter has already been aligned in a parallel manner to the fixture.

Figure 1:
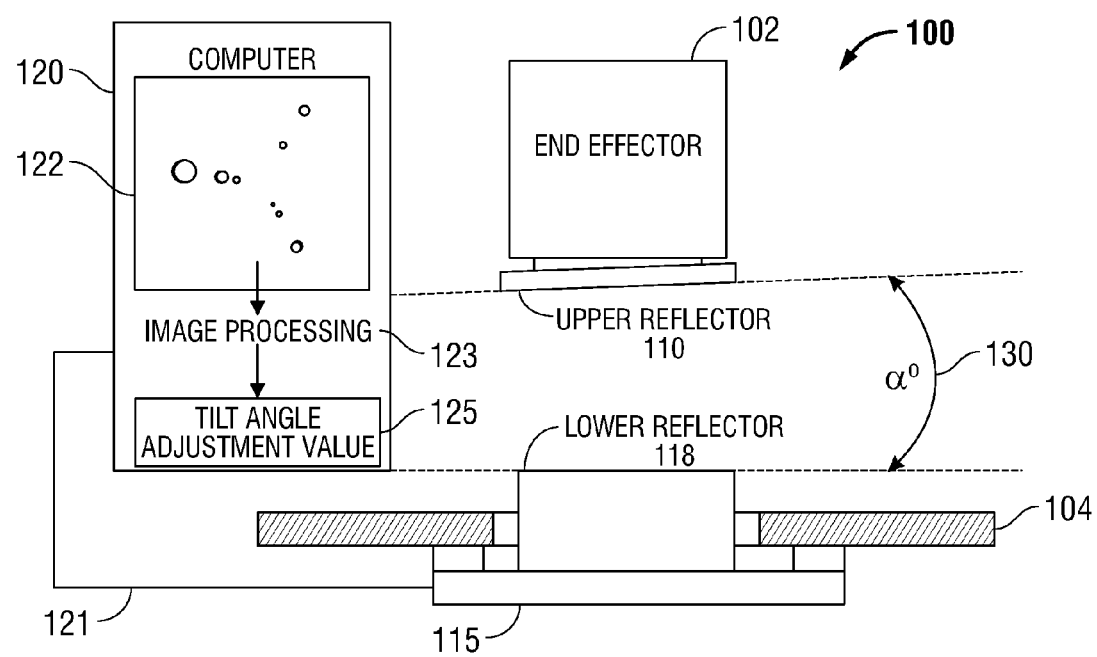
FIG. 1 illustrates an alignment system to align a manufacturing device having an end effecter and a fixture in a parallel manner, according to one embodiment of the invention.

With reference to FIG. 1, FIG. 1 illustrates an alignment system 100 to align a manufacturing device having an end effecter 102 and a fixture 104 in a parallel manner to improve manufacturing operations, according to one embodiment of the invention. The alignment system 100 may include an upper reflector 110 coupled to the end effecter 102 and a camera kit 115 coupled to the fixture 104. As will be described, camera kit 115 may include a plurality of light sources, a camera, and a lower reflector 118 mounted to the top portion of the camera kit 115. The lower reflector 118 may include a camera opening, a plurality of light source openings, and may be approximately parallel to the fixture. The camera kit 115 is attached to the fixture 104 in a suitable manner such that the camera kit is parallel to the fixture just as the device to be manufactured would be.

The camera is positioned beneath the camera opening of the camera kit 115 and may capture light images reflected from both the lower reflector 118 and the upper reflector 110 from the plurality of light sources. An image processor 120, such as a computer with a display device, may be coupled to the camera and the image data 122 associated with the captured light images may be transmitted from the camera of the camera kit 115 through a wired or wireless link 121 to the image processor 120 and the image processor through image processing 123 may determine a tilt angle adjustment value 125 based upon the image data 122 to tilt the end effecter 102 such that the end effecter 102 is moved to be approximately parallel to the fixture 104.

As can be seen in FIG. 1, initially, the end effecter 102 may be tilted and is not parallel to the fixture 104. This tilt angle is illustrated by line 130 and is undesirable in manufacturing processes. In particular, in manufacturing processes, the end effecter 102 should be parallel to the fixture 104 such that components to be placed and assembled to a device attached to the fixture 104 will occur in an accurate and parallel fashion. According to embodiments of the invention, an operator can continuously receive a tilt angle adjustment value 125 (which may be in terms of both roll and pitch) from the computer 120 through a visual display or other means until the operator can set the tilt angle to zero such that the end effecter 102 is parallel to the fixture 104 for improved manufacturing purposes. Alternatively, the computer 120 can be connected in a wired or wireless fashion to the end effecter 102 to instruct the end effecter to move itself to a tilt angle of zero such that the end effecter is parallel to the fixture for improved manufacturing purposes.

Figure 2A:
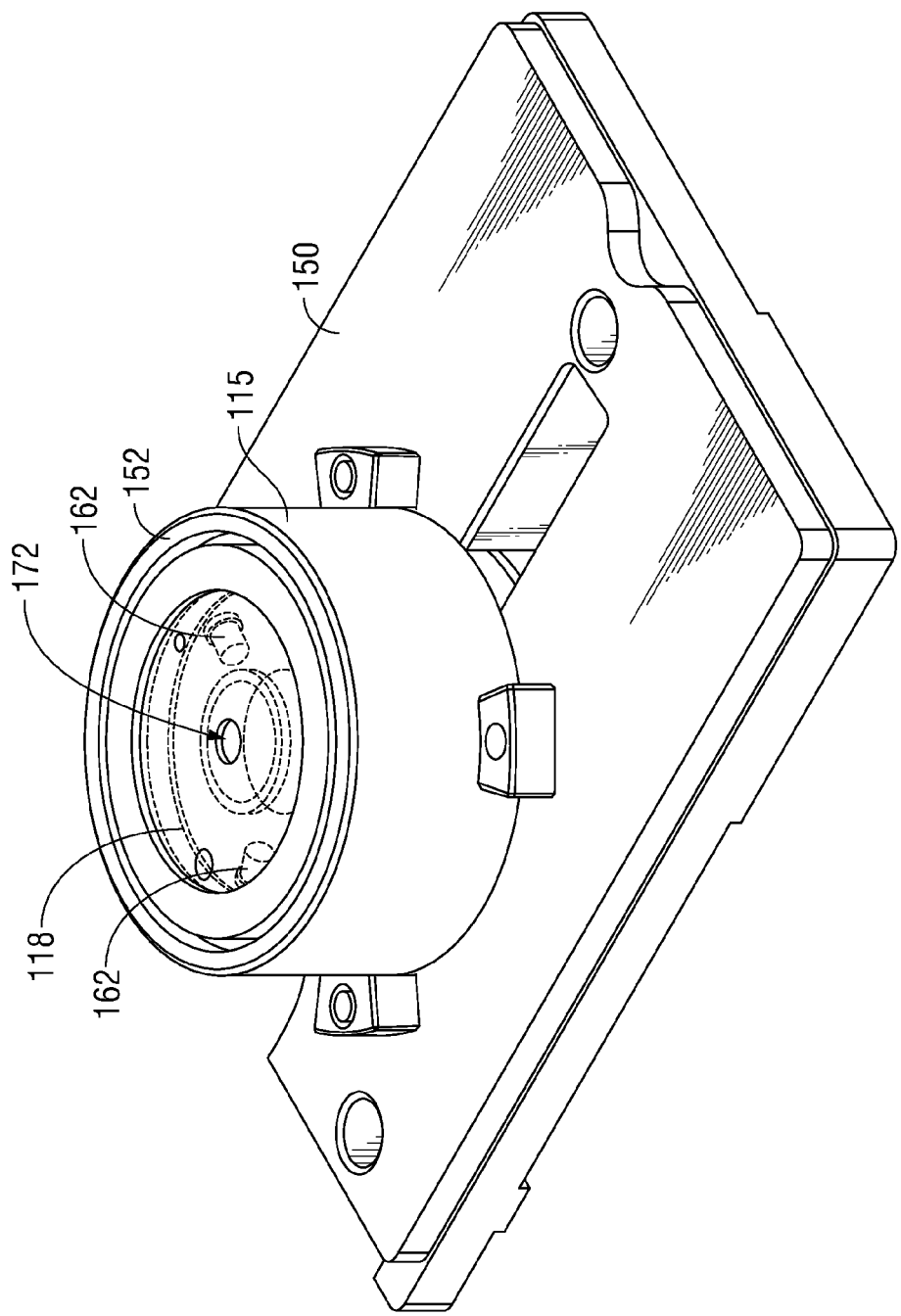
FIG. 2A is a perspective view of a camera kit, according to one embodiment of the invention.
Figure 2B:
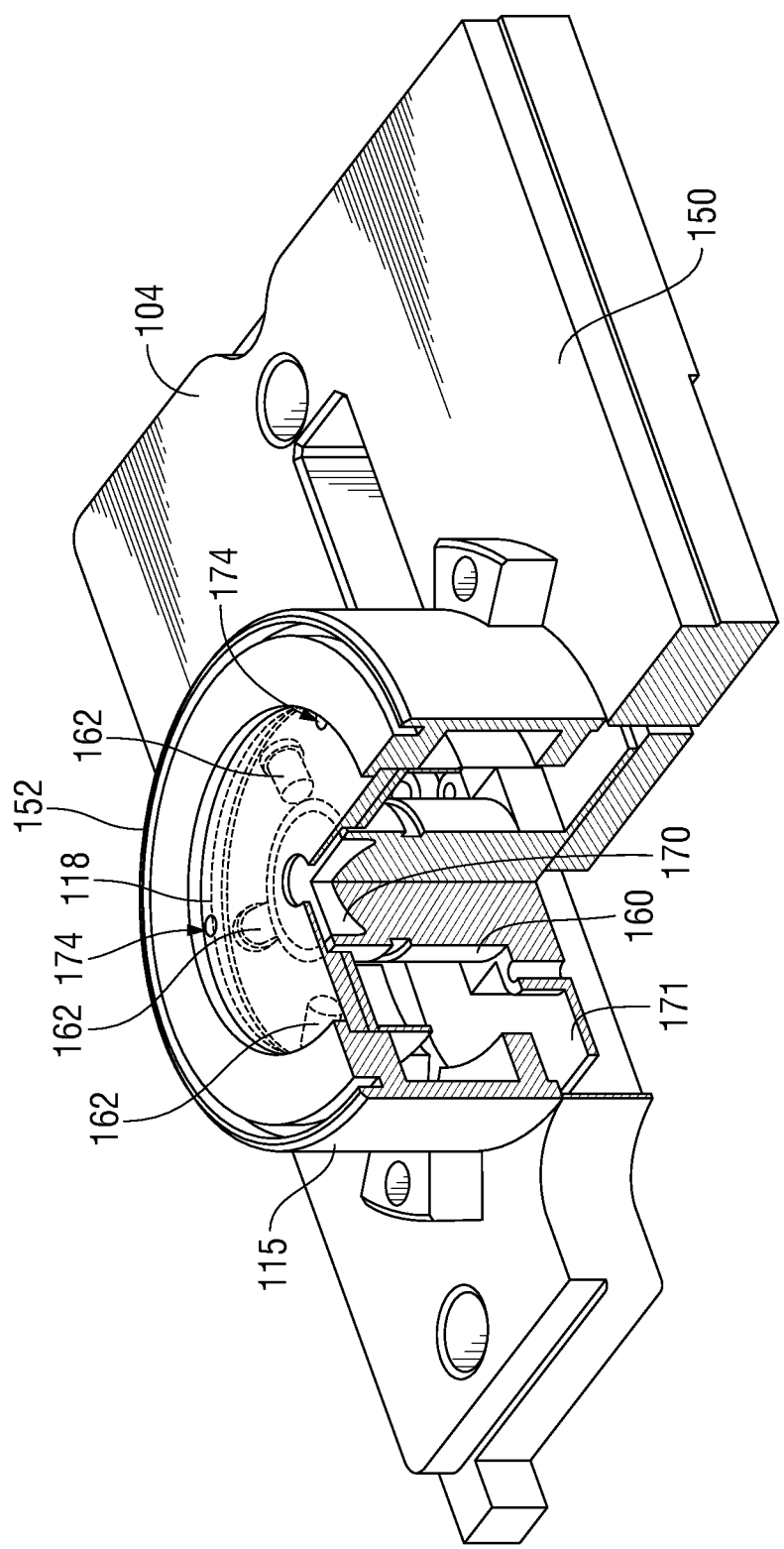
FIG. 2B is a perspective view of a camera kit with a cut-away view, according to one embodiment of the invention.
Figure 2C:
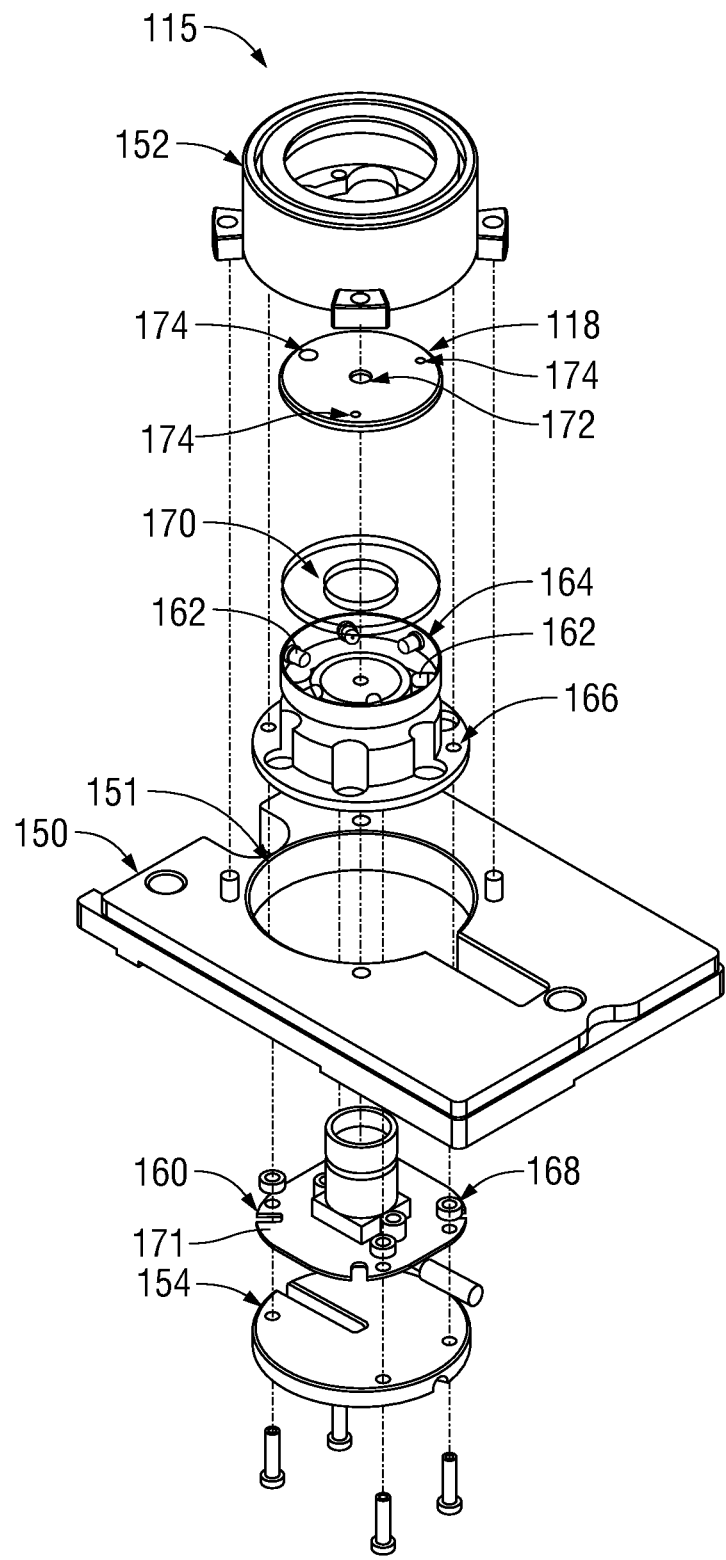
FIG. 2C is an exploded view of a camera kit, according to one embodiment of the invention.

With reference FIGS. 2A-2C, a perspective view, a perspective view with a cut-away, and an exploded view of a camera kit 115 that may be utilized with embodiments of the invention is illustrated. As shown in FIGS. 2A-2C, the camera kit 115 may have an approximately rectangular-shaped reference gage 150. Reference gage 150 includes a circular opening 151 to mount components of the camera kit 115. In particular, the camera kit 115 includes a circular-shaped housing 152 having mounting flanges to be mounted to protrusions from the top portion of the reference gage 150 by appropriate fasteners and a camera mount 154 to mount the camera 160 to the circular housing 152 and to other internal components of the camera kit 115 by suitable fasteners.

Further, other internal components of the camera kit 115 include a plurality of light sources 162 may be mounted to a ring lamp 164 on top of a pusher 166 having a centered cylindrical opening to receive the top portion of the camera 160. The pusher 166 may be mounted to the camera 160 and to the circular housing 152 with the suitable fasteners. Spacers 168 may also be mounted between the camera 160 and the pusher 166. The lower reflector 118 may be mounted within the circular housing 152 over the light sources 162. Additionally, a light filter 170 may be mounted between the lower reflector 118 and the light sources 162. It should be noted that the lower reflector 118 includes a camera opening 172 and a plurality of light source openings 174. In this example, the lower reflector 118 includes a circular camera opening 172 and three circular light source openings 174.

The plurality of light source openings 174 in the lower reflector 118 allow light to be transmitted from the light sources 162 to the upper reflector 110 attached to the end effector 102. In one embodiment, the plurality of light sources may be light emitting diodes (LEDs). In this example, six LEDs 162 are utilized. Although, it should be appreciated that other light sources may be utilized. Additionally, it has been found that by utilizing a linear polarizer film 170 that is mounted within the camera kit 115 that glare can be removed to improve the performance of the camera capturing the light images. This has been found make light dots more clear in the picture from the camera.

Further, the upper reflector 110 that is attached to the end effector 102 and the lower reflector 118 that is mounted within the circular housing 152 of the camera kit 115, in one embodiment, may be minors. Examples of suitable minors include substrate aluminum plates. However, other minors such as stainless steel and other suitable materials may be utilized. The camera 160 that is utilized may be a common commercially available digital camera that includes a printed circuit board 171. In one particular embodiment, camera 160 may be a commercially available web camera.

Thus, in operation, the camera kit 115 is secured in a parallel fashion to the fixture 104 such that the lower reflector 118 and camera 160 are similarly parallel to the fixture 104. An operator may then take a picture of the upper reflector 110 attached to the lower portion of the end effector 102. Because the camera 160 is positioned beneath the camera opening 172, the camera 160 captures light images reflected from both the lower reflector 118 and the upper reflector 110 from the plurality of light sources 162.

Figure 3:
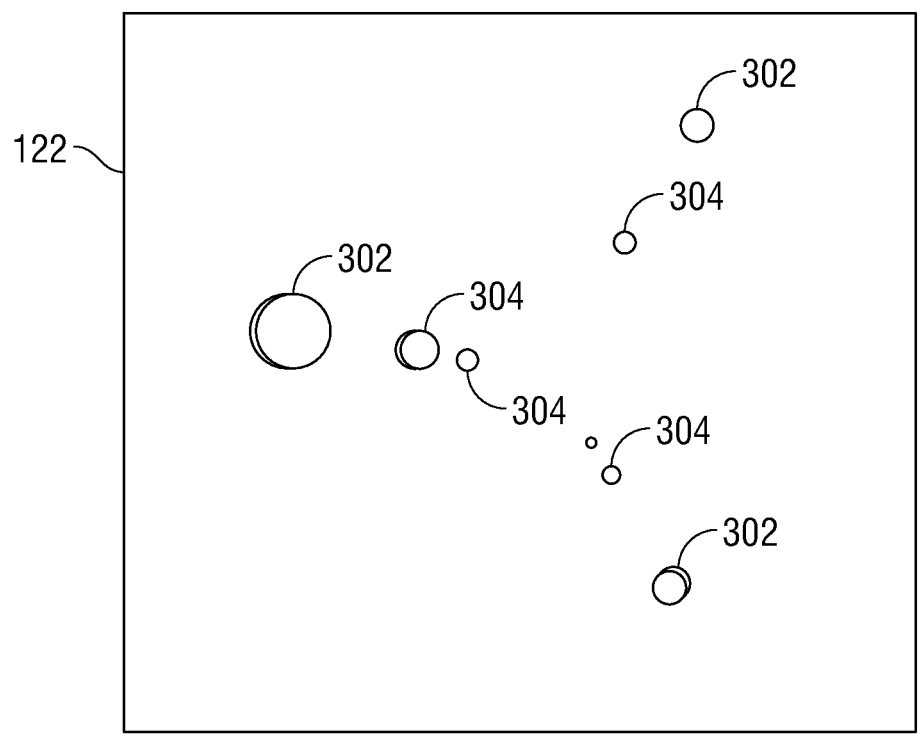
FIG. 3 is a diagram illustrating an example of a picture of light images, according to one embodiment of the invention.

With reference also to FIG. 3, which illustrates an example of a picture of light images 122 taken by the camera 160 of the upper reflector 110, it can be seen that some of the circular dotted 302 images are reflections from the upper reflector 110 directly from the light sources 162 through the openings 174 of the lower reflector 118 whereas other circular dotted images 304 are reflected images from the bottom reflector 118. By utilizing the three openings 174 of the lower reflector 118 which are basically 120 degrees apart, circular dotted images 302, 304 of the light image 122 are created that can be used to create image data that may be used by the image processing 123 of the computer 120 to create two basic circular patterns that can be used in an algorithm to estimate the difference between the circular patterns in order to estimate the difference in angular relationship (e.g., a tilt angle 130 in terms of both pitch and roll) between the upper reflector 110 and the lower reflector 118. Based upon this calculated difference in angular relationship, a tilt adjustment value 125 to move the end effecter 102 to be parallel to the fixture 104 may be calculated. It should be appreciated that other algorithms based upon the image data from the circular dotted images to analyze patterns (e.g., triangular patterns) and to calculate angular relationships between the upper and lower reflector may be utilized to calculate a tilt adjustment value.

Thus, initially, the end effecter 102 may be tilted and is not parallel to the fixture 104. As shown in FIG. 1, the tilt angle may be illustrated by line 130 and is undesirable in manufacturing processes. In particular, in manufacturing processes, the end effecter 102 should be parallel to the fixture 104 such that components to be placed and configured to a device attached to the fixture occur in an accurate and parallel fashion.

In particular, because the computer 120 is coupled to the camera 160 via a wired or wireless link 121, the image data 122, such as that shown in FIG. 3, can be transmitted from the camera 160 to the computer 120, which can perform image processing 123. The computer 120 based upon the image data 122 may determine a tilt angle adjustment value 125 based upon the image data to tilt the end effecter 102 such that the end effecter 102 can be moved to approximately a parallel position to the fixture.

According to embodiments of the invention, an operator can continuously receive a tilt angle adjustment value 125 (which may be in terms of both roll and pitch) from the computer 120 through a visual display or other means until the operator can set the tilt angle to zero such that the end effecter 102 is parallel to the fixture 104 for improved manufacturing purposes. As an example, the roll and pitch angles may be displayed as x and y values (e.g., positive and negative values) to the operator to move the end effecter 102 to zero tilt angle values such that the end effecter 102 is approximately parallel to the fixture 104. It should be appreciated that this end effecter angular movement information may be communicated to the operator in other ways such as by sound/vocal communication from the computer 120, arrow displays, etc.

In another embodiment, the computer 120 may be connected in a wired or wireless fashion to the end effecter 102 to instruct the end effecter to move itself to a tilt angle of zero such that the end effecter 102 is parallel to the fixture 104 for improved manufacturing purposes.

These previous-described functions may be implemented by computer software of the computer 120. However, it should be appreciated that a wide variety of electronic devices may be utilized to perform these image processing functions such as various types of circuitry, processors, controllers, etc., with display and/or sound devices.

By utilizing the previously-described implementations to have an end effecter 102 moved to be parallel to the fixture 104, a device can then be attached to the fixture 104 and components of the device can be assembled by the end effecter 102 in a much more precise and accurate fashion reducing assembly errors and reducing costs and contamination. Further, this results in time and cost savings in device manufacturing processes.

For example, in one embodiment, the manufacturing device may be a disk drive that is mounted to the fixture 104. In particular, a disk drive base structure may be mounted to the fixture 104 and the end effecter 102 may be a suction device for installing disk drive components within the disk drive base structure to assemble the disk drive. As examples, the disk drive components to be assembled may include disks, head stack assemblies, disk clamps, and other well know types of disk drive components. Because disk drive components need to be assembled in a very precise fashion to ensure that the disk drives are assembled accurately without damaging the disk media and other components, and with very low amounts of debris and contamination particles, the end effecter 102 being previously aligned in a parallel fashion to the fixture 104, and then the disk base structure itself being attached to the fixture 104, such that the end effecter 102 is parallel to the disk drive being assembled, significantly increases the accuracy of disk drive assembly.

It should be appreciated that some aspects of the invention may be implemented in the image processor 120, end effecter 120, camera kit 115, and/or or other circuitry, processors, controllers, computers, etc., of a manufacturing system, and may operate under the control of a program or routine to execute methods or processes in accordance with the previously described embodiments of the invention.

For purposes of the present specification, it should be appreciated that the terms "processor", "controller", "computer" etc., refer to any machine or collection of logic that is capable of executing a sequence of instructions and shall be taken to include, but not limited to, general purpose microprocessors, special purpose microprocessors, central processing units (CPUs), digital signal processors (DSPs), application specific integrated circuits (ASICs), multi-media controllers, signal processors, microcontrollers, etc.

Thus, components of the various embodiments of the invention may be implemented as hardware, software, firmware, microcode, or any combination thereof. When implemented in software, firmware, or microcode, the elements of the embodiment of the invention are the program code or code segments that include instructions to perform the necessary tasks. A code segment may represent a procedure, a function, a sub-program, a program, a routine, a sub-routine, a module, a software package, or any combination of instructions, data structures, or program statements.

The program, instruction, or code segments may be stored in a processor readable medium. The "processor readable or accessible medium" may include any medium that can store, transmit, or transfer information. Examples of accessible media include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The code segments may be downloaded via computer networks such as the Internet, Intranet, etc. The processor readable or accessible medium may include data that, when accessed by a processor or circuitry, cause the processor or circuitry to perform the operations described herein. The term "data" herein refers to any type of information that is encoded for machine-readable purposes. Therefore, it may include programs, code, data, files, etc.

While embodiments of the invention and their various electrical, mechanical and functional components have been described in particular embodiments, it should be appreciated that the embodiments can be implemented with a wide variety of differing electrical, mechanical and functional components, and combinations thereof. Further, although one particular embodiment has been described as being employed for use in a disk drive manufacturing process, the embodiments of the invention may be implemented with numerous other types of manufacturing processes to manufacture a wide variety of different types of devices.

What is claimed is:

1. An alignment system to align a manufacturing device having an end effecter and a fixture in a parallel manner, the alignment system comprising:
    an upper reflector to couple to the end effecter;
    a camera kit to couple to the fixture including:
        a plurality of light sources;
        a camera; and
        a lower reflector including a camera opening and a plurality of light source openings, the lower reflector being approximately parallel to the fixture, wherein the camera is positioned beneath the camera opening, the camera to capture light images reflected from both the lower reflector and the upper reflector from the plurality of light sources; and
    an image processor coupled to the camera, wherein image data associated with the captured light images is transmitted from the camera to the image processor, the image processor to determine an adjustment value based upon the image data to tilt the end effecter such that the end effecter is moved to be approximately parallel to the fixture.

2. The alignment system of claim 1, wherein the plurality of light source openings in the lower reflector allow light to be transmitted to the upper reflector from the plurality light sources.

3. The alignment system of claim 1, further comprising linear polarizer films mounted in the camera kit to remove glare.

4. The alignment system of claim 1, wherein the plurality of light sources include light emitting diodes (LEDs).

5. The alignment system of claim 1, wherein the upper and lower reflectors include minors.

6. The alignment system of claim 5, wherein the mirrors include substrate aluminum plates.

7. The alignment system of claim 1, wherein the camera is a webcam.

8. The alignment system of claim 1, wherein the image processor is a computer.

9. The alignment system of claim 1, wherein the manufacturing device is a disk drive manufacturing device in which the fixture is for mounting a disk drive base structure and the end effecter is for mounting disk drive components within the disk drive base structure.

10. The alignment system of claim 9, wherein the end effecter is a suction device.

11. The alignment system of claim 9, wherein the disk drive components include at least one of a disk, a head stack assembly, or a disk clamp.

12. A camera kit for use in an alignment system to align a manufacturing device having an end effecter and a fixture in a parallel manner, in which an upper reflector is coupled to the end effecter, the camera kit comprising:
    a plurality of light sources;
    a camera; and
    a lower reflector including a camera opening and a plurality of light source openings, the lower reflector being approximately parallel to the fixture, wherein the camera is positioned beneath the camera opening, the camera to capture light images reflected from both the lower reflector and the upper reflector from the plurality of light sources.

13. The camera kit of claim 12, further comprising an image processor coupled to the camera, wherein image data associated with the captured light images is transmitted from the camera to the image processor, the image processor to determine an adjustment value based upon the image data to tilt the end effecter such that the end effecter is moved to be approximately parallel to the fixture.

14. The camera kit of claim 12, wherein the plurality of light source openings in the lower reflector allow light to be transmitted to the upper reflector from the plurality light sources.

15. The camera kit of claim 12, further comprising linear polarizer films mounted in the camera kit to remove glare.

16. The camera kit of claim 12, wherein the plurality of light sources include light emitting diodes (LEDs).

17. The camera kit of claim 12, wherein the upper and lower reflectors include minors.

18. The camera kit of claim 17, wherein the mirrors include substrate aluminum plates.

19. The camera kit of claim 12, wherein the camera is a webcam.

20. The camera kit of claim 12, wherein the manufacturing device is a disk drive manufacturing device in which the fixture is for mounting a disk drive base structure and the end effecter is for mounting disk drive components within the disk drive base structure.

21. The camera kit of claim 20, wherein the end effecter is a suction device.

22. The camera kit of claim 20, wherein the disk drive components include at least one of a disk, a head stack assembly, or a disk clamp.

* * * * *